United States Patent [19]
Zurek

[11] 4,419,560
[45] Dec. 6, 1983

[54] WELDING CONTROL WITH AUTOMATIC PERCENT HEAT ADJUSTMENT

[75] Inventor: Thomas E. Zurek, Redford, Mich.

[73] Assignee: Midland-Ross Corporation, Cleveland, Ohio

[21] Appl. No.: 218,319

[22] Filed: Dec. 19, 1980

[51] Int. Cl.³ .............................................. B23K 11/24
[52] U.S. Cl. .................................. 219/117.1; 219/110
[58] Field of Search ............. 219/110, 109, 108, 117.1

[56] References Cited

U.S. PATENT DOCUMENTS

| | | | |
|---|---|---|---|
| 3,546,421 | 12/1970 | Meyer et al. | 219/110 |
| 4,024,371 | 5/1977 | Drake | 219/110 |
| 4,302,653 | 11/1981 | Denning et al. | 219/110 |

*Primary Examiner*—C. C. Shaw
*Attorney, Agent, or Firm*—H. Duane Switzer

[57] ABSTRACT

This welding control method and apparatus automatically adjusts the percent heat of a welding machine in response to the duration of the preceding welds. The duration of each weld is measured by counting the line cycles. The line cycle count is compared with a percent heat increase condition and with a percent heat decrease condition of a preselected percent heat algorithm. The percent heat is incremented in response to the percent heat increase condition being met and the percent heat is decremented in response to the percent heat decrease condition being met. The control detects the weld resistance at the peak of each line cycle and compares the detected resistance with a resistance condition of a preselected resistance algorithm. The weld is terminated in response to the resistance condition being met and the cycle count being between a low limit count and a high limit count. The percent heat increase condition occurs at a predetermined number of successive welds terminating at the high limit count and the percent heat decrease condition occurs at a predetermined number of successive welds terminating at the low limit count.

30 Claims, 9 Drawing Figures

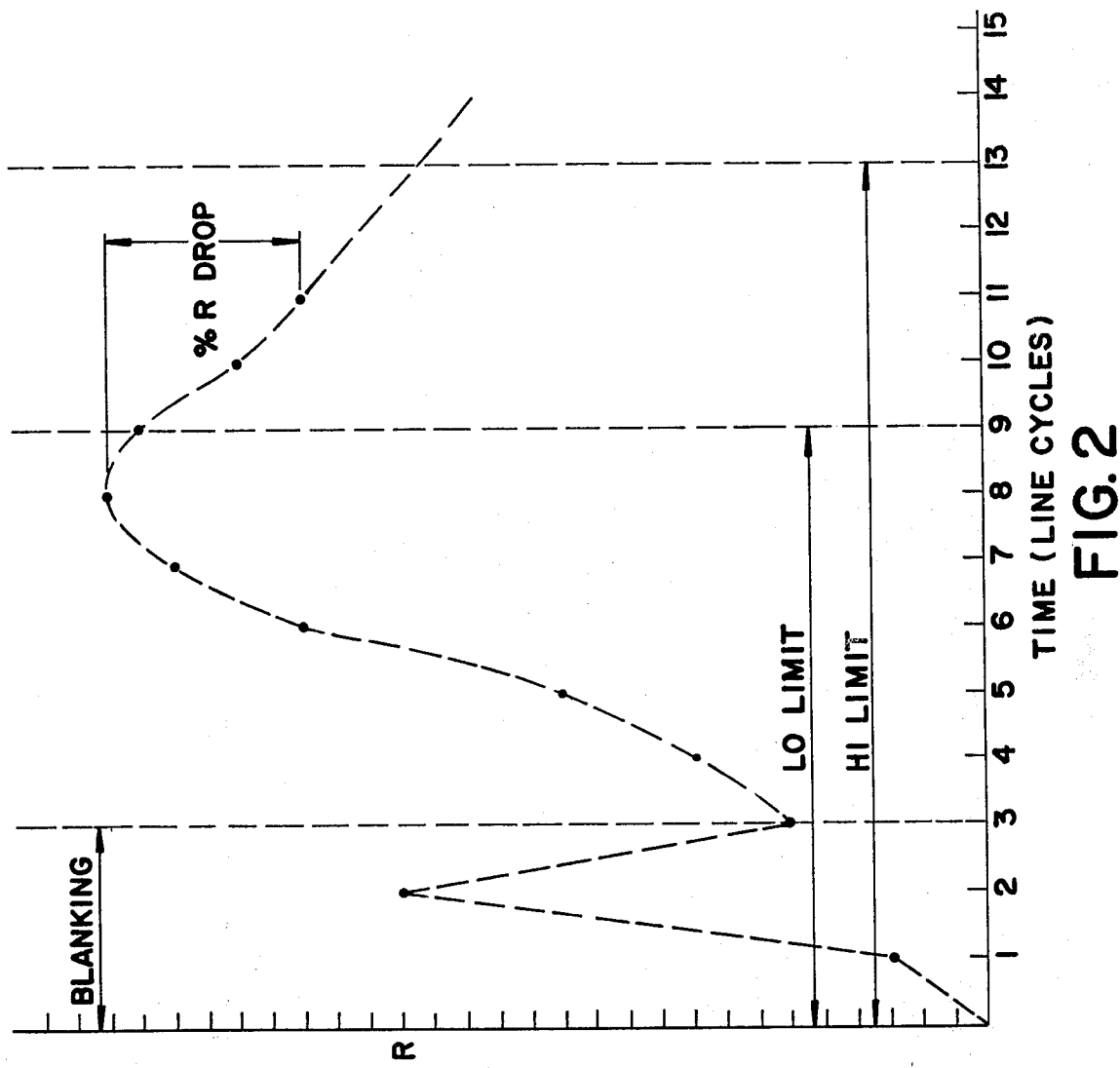
FIG. 2
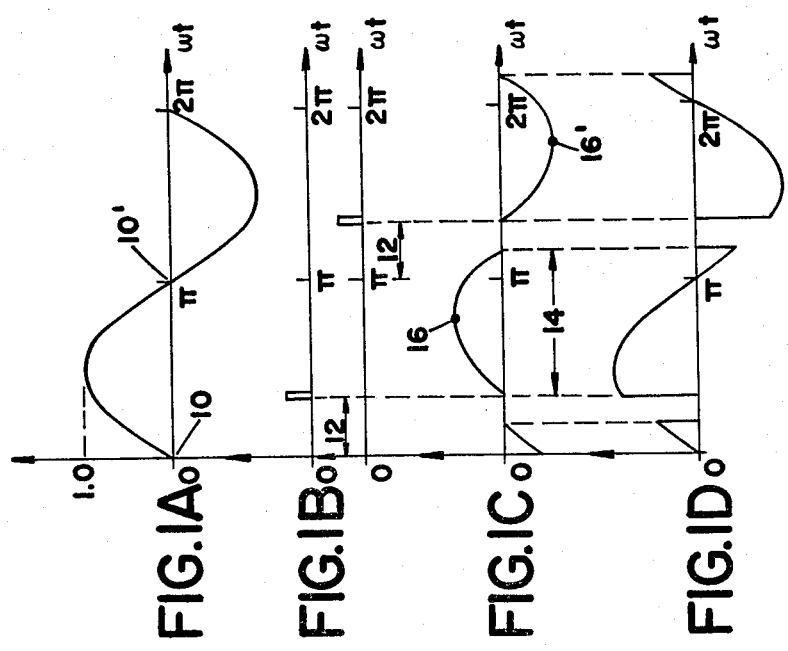
FIG. 1A
FIG. 1B
FIG. 1C
FIG. 1D

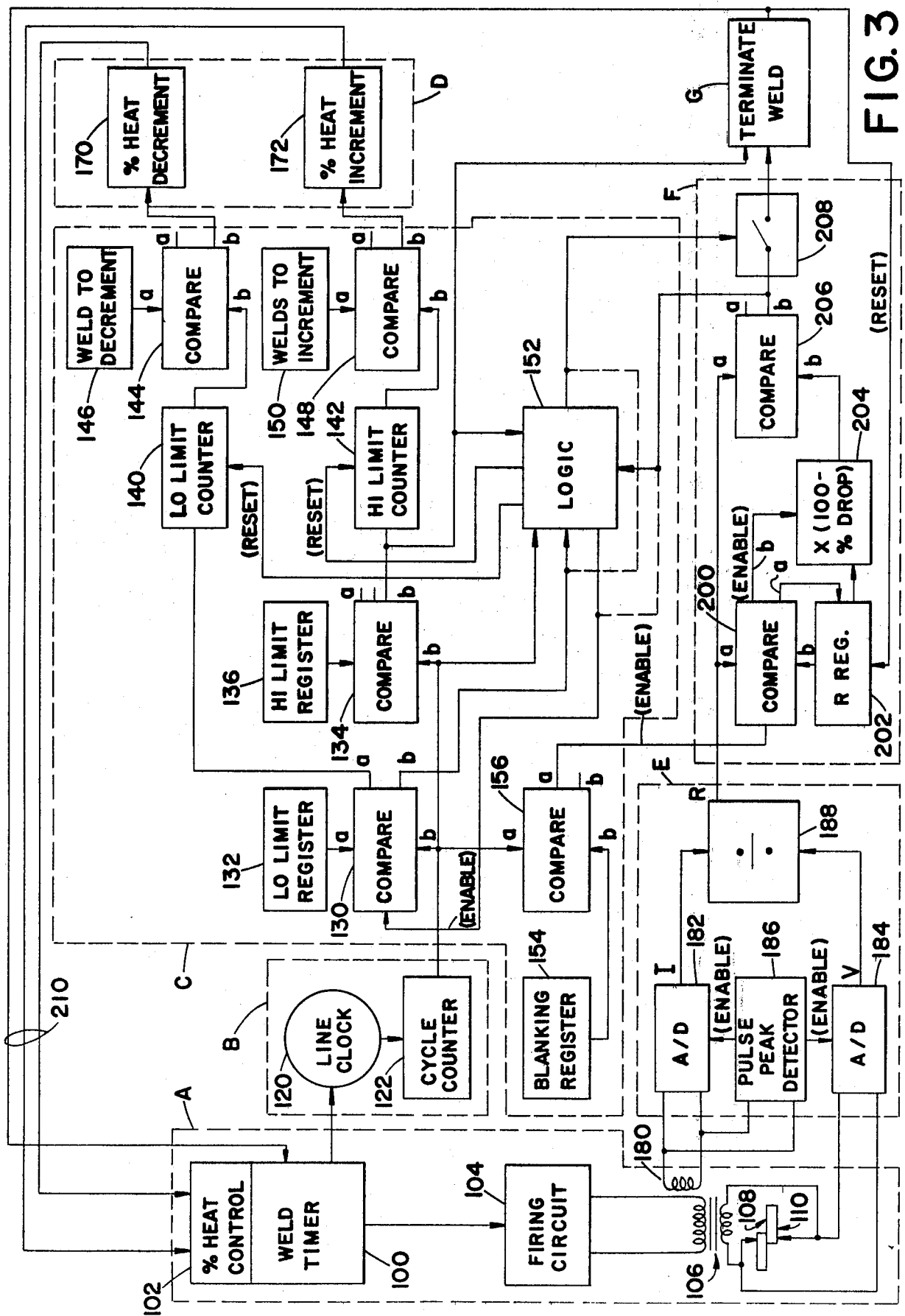

WELDING CONTROL WITH AUTOMATIC PERCENT HEAT ADJUSTMENT

BACKGROUND OF THE INVENTION

This application pertains to the art of resistance welding and more particularly to a method and apparatus for automatically controlling resistance welding equipment.

The invention is particularly applicable to robot or other production line welding equipment which automatically makes a large number of consecutive welds without direct operator intervention or servicing. The plurality of welds may be made by performing the same welding function on each of a plurality of workpieces moving along an assembly line, by performing a number of different welding functions on each of a plurality of workpieces moving along an assembly line and the like. It will be appreciated, however, that the invention may find application in many types and styles of resistance welding equipment, including relatively simple and manually operated welders.

In resistance welding, a pair of electrodes are clamped on either side of the metallic workpieces which are to be welded and a welding current is then applied across the electrodes. As the current flows through the workpieces, the resistance of the metal and the interface conditions cause heating which is sufficient to melt the metal. It has been found that the resistance across the metal stock or workpieces during welding varies according to a predictable pattern. Although the resistance may be erratic during the first few milliseconds that the welding current is applied, the general trend is for the resistance to increase as the stock is heated. At some point during the weld, the resistance peaks and then begins to decrease. It is theorized that the resistance fluctation during the first few cycles is attributable to interface conditions, e.g., oil films, oxidation, surface conditions, the mating relationship or fit between the surfaces and the like. As further theorized, the increase in resistance is attributable to the higher resistance of hot and molten metals. Also, the decrease in the weld resistance after the peak is attributable to metal fusion and the resulting destruction of the interface resistance of the parts being welded. It has been found that the nugget size of the weld is roughly related to the percentage drop in the weld resistance from its peak value to the termination of the weld.

It has further been found that the quality of a weld is related to the weld time or duration. Particularly, it has been found that for given metallic stock to be welded, there is an optimum weld duration. If the predetermined percentage drop in resistance occurs in less than the optimal time or requires longer than the optimal time to occur, the weld is likely to be weak. As the weld duration becomes more divergent from the optimal weld time, the chances of the weld being bad or weak become greater. Thus, it is advantageous to set a low time limit to the weld to which the weld is continued regardless of the percent drop in resistance. Similarly, it is advantageous to set a high time limit to each weld at which the weld is terminated regardless of the drop in resistance.

It has been found that the repeated clamping of the weld electrodes over a large number of welds tends to cause the electrodes to mushroom, i.e., expand in cross-sectional area. Applying the same weld current through mushroomed electrodes decreases the current density, i.e., the weld current per unit area of electrode cross section. The decreasing weld current density from the mushrooming is apt to increase weld time sufficiently so that it exceeds the high limit on substantially all welds. Also, variations in the stock during a production run can cause the weld time to be beyond or outside the high or low limit.

Heretofore, welding controls have determined whether the weld time is between the high or low limits. The commonly assigned U.S. Pat. No. 3,588,438 issued June 28, 1971 to Peter W. Vanderheist shows a welding control that sounds an alarm when the weld is not between the high and low limits. When the alarm sounds, the welding machine operator manually makes appropriate adjustments to bring the weld time back into the optimal range. Such adjustments include the percent heat, reshaping or adjusting the cross-sectional area of the electrodes and the like. Others have previously suggested that a compensation can be made for electrode mushrooming by incrementing the percent heat by a small amount each time the welder completes a preselected number of welds.

One problem with prior art welding controls has been a lack of accuracy in adjusting the percent heat as the electrodes mushroom or the stock itself varies. There is a tendency for the operator to over or under adjust the percent heat in response to a high or low limit alarm. Frequently, the percent heat is alternately increased and decreased in an attempt to zero in on the continuously changing optimum percent heat.

The present invention contemplates a new and improved method and apparatus for controlling welding equipment which overcomes all of the above-referenced problems and others. The invention also provides a method and apparatus for controlling the percent heat which is very reliable and highly accurate.

SUMMARY OF THE INVENTION

In accordance with the present invention, a welding control is provided which adjusts the percent heat automatically in accordance with a function of the duration of the preceding weld or welds.

In accordance with a more limited aspect of the invention, a method and apparatus for controlling a welding machine is provided which increments the percent heat automatically after a preselected number of welds are terminated at the high limit and which automatically decrements the percent heat when a preselected number of welds are terminated at the low limit.

A principal advantage of the invention resides in the automatic adjustment of the percent heat as a function of the duration of the preceding welds.

Another advantage of the present invention is in achieving consistently high resistance weld quality.

Still other advantages will become apparent upon a reading and understanding of the following detailed description.

BRIEF DESCRIPTION OF THE DRAWINGS

The invention may take form in various parts or steps and arrangements of such parts or steps, a preferred embodiment of which is illustrated in the accompanying drawings which form a part hereof.

FIGS. 1A, B, C, and D are diagrammatic illustrations of weld parameters, including weld current and voltage as applied by an alternating current welding apparatus;

FIG. 2 is a graphical representation of a typical variation in weld resistance with weld time;

FIG. 3 is a block diagram of a weld control circuit in accordance with the present invention;

DESCRIPTION OF THE PREFERRED EMBODIMENT

Figure 4:
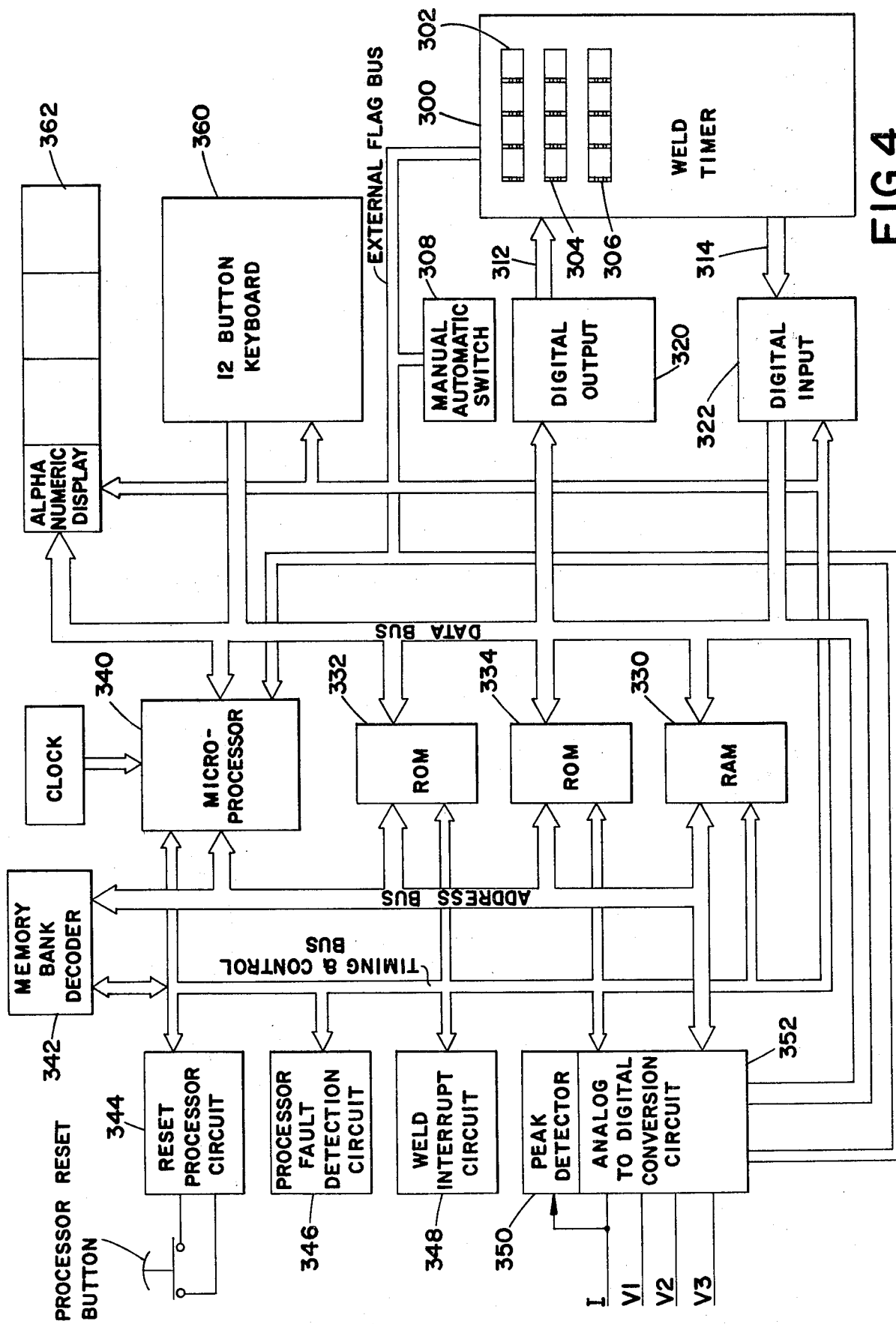
FIG. 4 is a block diagram of a computer based weld control circuit in accordance with the present invention.

With reference to the drawings wherein the showings are for purposes of illustrating the preferred embodiment of the invention only and not for purposes of limiting same. The temperature elevation or heat of a weld is proportional to the square of the welding current, the resistance of the stock, and the duration of the weld. To vary the temperature of the weld, the amount of weld current is commonly varied. In an a.c. welding apparatus, a power source supplies to a firing circuit a sinusoidally oscillating voltage, one line cycle of which is illustrated in FIG. 1A. Typically, the firing circuit includes a pair of SCR's for gating the positive going portion and the negative going portion of each line cycle to a weld or weld transformer. If the SCR's are gated as the power supply voltage crosses the origin as denoted in FIG. 1A at crossing points 10 and 10', all of the available power is channelled to the weld. This produces the maximum weld temperature and is commonly denoted as 100 percent heat. By gating the SCR's with pulses, as illustrated in FIG. 1B, which are offset from the crossing points 10 and 10' by a phase shift 12, the percent heat can be reduced. When the SCR's are gated, a weld current, as illustrated in FIG. 1C, and a weld voltage, as illustrated in FIG. 1D, are produced. As the phase shift 12 is increased, the percent heat and a conduction angle 14 decrease. The inductive load from the weld transformer causes the weld current to lag the weld voltage. The inductive lag causes the weld current to reach an apex 16 or 16' after the weld voltage has reached an apex value.

In FIG. 2, a typical weld resistance versus time in line cycles graph is illustrated. Each time the welding current reaches apex 16 or 16' (FIG. 1C), the weld resistance is detected. During the first few line cycles, the resistance is typically erratic and, accordingly, the resistance values measured during the first few line cycles are normally blanked or discarded in practicing the preferred embodiment of the present invention. After this blanking period, the resistance of each weld progressively increases. At some point, illustrated in FIG. 2 at the eighth line cycle, the resistance reaches a peak resistance value. Thereafter, the resistance drops progressively with each line cycle. The weld is terminated when the resistance drops a predetermined percentage below the resistance peak. In the graphic illustration of FIG. 2, this percentage drop occurs in the eleventh line cycle.

Also illustrated in FIG. 2 is a low limit weld time at nine line cycles and a high limit weld time at thirteen line cycles. These limits are selected from past experience with the particular metal stock involved. In this particular example, it was determined that the weld strength was weaker if the weld was terminated in less than nine line cycles or more than thirteen line cycles. If the percent heat is increased, more power is applied to the weld. Increasing the percent heat tends to cause the resistance to rise more quickly toward the peak resistance and to drop off more quickly after the peak. If the percent heat is too high, the predetermined percentage resistance drop may occur before the low limit. Analogously, if the percent heat is reduced, the resistance curve becomes more flat. Lowering the percent heat may cause the predetermined percentage resistance drop to occur after the high limit. Variations in the resistance curve may be caused by a number of factors including mushrooming of the electrodes. Other factors, such as a flaw or inclusion in the stock to be welded, can also alter the resistance curve erraticly.

FIG. 3 is a block diagram for a conventional welding apparatus or machine A in combination with a welding control circuit constructed in accordance with the present invention. Because the welding machine is of a conventional design and the specific details thereof do not comprise a part of the invention, further description thereof is deemed unnecessary to an appreciation and understanding of the new control method and apparatus. Generally, the welding control circuit includes a weld duration measuring means B for measuring the duration of each weld. In the preferred embodiment, the measure of time is comprised of the number of line cycles in each weld. Connected with weld duration measuring means B is a heat adjustment algorithm means C for comparing the actual duration of each weld with a preselected percent heat adjustment condition. When the preselected adjustment condition is met, heat adjustment algorithm means C produces an adjustment signal. A percent heat adjustment means D adjusts the percent heat in welding machine A in response to the adjustment signal. More specifically, heat adjustment algorithm means C compares the cycle count with a preselected percent heat increment or increase condition and with a preselected percent heat decrement or decrease condition. In response to the increment or decrement condition being met, the percent heat adjusting means D increases or decreases the percent heat, respectively.

Also connected with the conventional welding machine A is a weld resistance means E for detecting the weld resistance. Connected with the weld resistance means E is a weld resistance algorithm means F for comparing the detected weld resistance with a predetermined resistance condition of a resistance algorithm. Connected with the resistance algorithm means F is a weld terminating means G for terminating the weld at the end of the next line cycle after the conditions of the resistance algorithm are met.

More particularly, and with continued reference to FIG. 3, the standard welding machine A includes a weld timer 100 for initiating and terminating a weld and performing other weld control functions. The weld timer includes a percent heat adjustment 102 for adjusting the percent heat of each weld. The percent heat is adjusted by gating the SCR such that the appropriate percent of the power in each line cycle is delivered to the weld. Connected with the weld timer 100 is a firing circuit 104 for applying the welding current to a welding transformer 106. Connected with the welding transformer 106 are one or more pairs of electrodes 108, 110 for making a clamping connection with the stock to be welded.

The weld duration measuring means includes a line clock 120 which produces an edge at a characteristic point in each line cycle, e.g., at crossing point 10 (FIG. 1A). Connected with the line clock is a cycle counter 122 for counting the number of edges whereby the count of this cycle counter comprises a measure of the duration in cycle counts of the weld in progress.

The heat adjustment algorithm means C may implement any one of numerous algorithms based on the weld duration or cycle count to control the adjustment of the percent heat. In the preferred embodiment, the algorithm thus implemented causes the percent heat to be increased after a preselected number of successive welds have terminated at the high weld limit, i.e., the predetermined percentage drop has failed to occur before the high limit. In a similar manner, the algorithm further causes the percent heat to be decremented after a preselected number of welds have terminated at the low weld limit, i.e., the predetermined percentage drop has occurred at or before the low limit. To that end, heat adjustment algorithm means C includes a first or low limit comparator 130 for comparing the actual weld duration with a low limit duration and a second or high limit comparator 134 for comparing the actual weld duration with a high limit duration. More specific to the preferred embodiment, the low limit comparator 130 compares the cycle count from counter 122 with a preselected low limit cycle count number from a low limit register 132 and the high limit comparator 134 compares the current count from cycle counter 122 with a preselected high limit cycle count number from a high limit register 136. The low limit comparator 130 is enabled by the resistance algorithm means F when the predetermined resistance condition is met. In this manner, comparator 130 only compares the cycle count that marks the meeting of the resistance algorithm condition and subsequent cycle counts with the low limit count. The high limit comparator operates continuously. Commonly, when a high limit weld occurs, the resistance algorithm condition has not been met.

Connected with the low and high limit comparators 130, 134 are low limit and high limit weld counters 140, 142, respectively. Low limit weld counter 140 counts the number of welds in which the low limit or heat decrement condition is met, i.e., the number of welds in which the predetermined resistance drop occurred at or before the low limit count in register 132. Analogously, high limit weld counter 142 counts the number of welds in which the high limit or heat increment condition is met, i.e., the number of welds terminated at the high limit. A third or welds at the low limit condition comparator 144 compares the low limit weld count with a preselected number of welds stored in a welds to decrement register 146. When the number counted on the low limit welds counter 140 matches the number of welds stored in register 146, percent heat adjustment means D is caused to decrement the percent heat. Analogously, a fourth or welds at the high limit comparator 148 compares the high limit weld count on the high limit weld counter 142 with a preselected number of welds stored in a welds to increment register 150. When the count in the high limit welds counter 142 matches the number of welds stored in register 150, the percent heat adjustment means D is caused to increment the percent heat.

A logic means 152 is provided for performing certain resetting and enabling functions. Specifically, this logic means resets low limit counter 140 whenever a normal weld or a high limit weld is produced. This causes low limit welds comparator 144 to enable the percent heat adjustment means only after a preselected number of consecutive low limit welds have occurred. Similarly, logic means 152 resets high limit counter 142 each time that a normal or low limit weld is produced. This causes high limit welds comparator 148 to enable percent heat adjustment means D only after a preselected number of consecutive high limit welds have occurred. Logic means 152 also enables low limit comparator 130 in response to receiving an output from resistance algorithm means F indicating that that resistance conditions are met. Alternately, logic means 152 may be bypassed and the output from the resistance algorithm means F may enable comparator 130 directly. Logic means 152 also provides an output signal to block enabling of the weld terminating means G until after the low limit has been met. The output of high limit comparator 134 is also operatively connected with weld terminating means G for causing the weld to terminate when the high limit is met.

The heat adjusting algorithm means C also includes a blanking register 154 for storing the number of line cycles during which the resistance algorithm means F is to be blanked or disabled. A blanking comparator 156 compares the cycle count from counter 122 with the blanking count from blanking register 154. When the cycle count from counter 122 matches the blanking count the blanking register, blanking comparator 156 enables resistance algorithm means F. The heat adjusting algorithm may advantageously be embodied in a computer which is programmed to implement the above described algorithm or other appropriate algorithms.

Percent heat adjusting means D includes a percent heat decrementing means 170 for decreasing the percent heat by a preselected increment. In a welding machine which uses an SCR trigger in the percent heat control, the percent heat decrementing means 170 adjusts the bias by an incremental resistive amount to raise the firing point of the SCR. The percent heat adjusting means also includes a percent heat incrementing means 172. This percent heat incrementing means adjusts the bias on the SCR to lower the firing point of the SCR to an earlier point in each current cycle.

Resistance detecting means E detects the weld current and weld voltage and by dividing the voltage by the current determines the weld resistance. A coil 180 determines the welding transformer primary current flow and the amplitude of the current is converted to a digital signal by an analog to digital converter 182. The voltage across the weld is used as the input to an analog to digital converter 184 which produces a digital signal proportional to the weld voltage. A peak height detector 186 determines when the weld current is at current peak 16 or 16' (FIG. 1C). When the weld current reaches a peak, the pulse height detector enables analog to digital converters 182, 184. A divider 188 divides the voltage by the current to determine the weld resistance. In this manner, the present cycle resistance is determined at each line cycle peak.

Resistance algorithm means F may implement any of numerous resistance algorithms. In the preferred embodiment, however, the resistance algorithm means determines when the resistance has reached a peak and dropped off by a predetermined percentage. When such a condition is met, it causes weld terminating means G to terminate the weld. Other resistance algorithms may, of course, also be implemented if desired. Resistance algorithm means F includes a first resistance comparator 200 for comparing the present cycle resistance from resistance detecting means E with a resistance value stored in a resistance register 202. Comparator 200 returns the higher of the two resistance values to resistance register 202. As the resistance versus line cycle curve (FIG. 2) is building toward a peak, the present cycle resistance from the resistance detector is the higher. When the resistance value from the resistance register 202 is the higher, it indicates that the peak has been crossed and that it is appropriate to start determining whether or not the predetermined percentage drop condition is met. When the resistive value from register 202 is the greater, comparator 200 enables a multiplying means 204 to multiply the peak resistance value stored in the resistance register 202 by a predetermined value. In the preferred arrangement, this predetermined value is the quantity 100 percent minus the preselected percentage drop in the resistance from the peak at which the weld is to be terminated.

A second resistance comparator 206 compares the termination resistance value from multiplying means 204 with the present cycle resistance from the resistance detector E. When the present cycle resistance from the resistance detector E matches or is below the termination resistance value of multiplying means 204, the end of the weld condition has been met. Second comparator 206 then produces a signal to cause weld terminating means G to terminate the weld. An inhibiting means 208 prevents the signal indicating that the resistance condition has been met from being conveyed to the weld terminating means G until the number of line counts matches or exceeds the low limit. Resistance algorithm means F may be conveniently embodied in a computer which is programmed to implement the above described algorithm or other appropriate algorithms. Further, a single computer may be used to implement the heat adjustment algorithm and the resistance algorithm as well as perform other system functions including for example cycle counting, weld resistance calculating and the like. As noted above, weld terminating means G provides an end weld signal to the weld timer 100 in response to some predetermined resistance condition being met. The outputs of heat adjusting means D and weld terminating means G are carried to weld timer 100 by a control bus 210.

FIG. 4 comprises a block diagram which shows a preferred embodiment of the present invention which is microprocessor controlled. In that figure, a conventional weld timer 300 is shown in combination with the control circuit. The weld timer includes three sets of thumbwheels 302, 304, and 306. In its manual mode, each set of thumbwheels sets the appropriate weld time, percent heat, and other welding parameters for one of a plurality of welding schedules. Each schedule, i.e., type of weld desired, has independent weld time, percent heat and other welding parameters. By way of example, one schedule may be implemented to weld two pieces of sheet stock to each other and another schedule implemented to weld a piece of the sheet stock to a frame or support member. The thumbwheel sets enable the weld timer to control three different schedules or types of welds without resetting the weld conditions each time.

In the manual mode, the control circuit monitors and records actual weld parameter information about each weld but does not control the welding. In the automatic mode in which the control circuit of the present invention controls weld timer 300, the thumbwheels are disconnected and the control circuit assumes performance of their functions. A manual-automatic switch 308 determines whether the weld timer is to be operated in its manual mode or its automatic mode.

Weld timer 300 is connected with a flag bus 310 on which it produces a sync signal periodically during each weld, e.g., at the beginning of each line cycle. The sync signal corresponds to the output of line clock 120 (FIG. 3). A control bus 312 provides the signals to the weld timer which replace the signals from the thumbwheels. An input bus 314 provides information to the control circuit concerning the nature of the weld in progress. Specifically, it indicates which of the three schedules are called for and what part of the weld the timer is in, i.e., the squeeze, clamp, preheat, etc.

Connected with control bus 312 is a digital output circuit 320 which receives intermittent commands from the control circuit and provides a continuous command output to main weld timer 300. It provides a command of the percent heat to replace the percent heat that would have been set by the thumbwheels, a signal to disable the thumbwheels when the control circuit is in command, a signal for stopping the timer of the main weld timer and an error signal (when appropriate) to indicate a problem such as the percent heat reaching its maximum. Digital output circuit 320 is composed of a plurality of latches and buffers for providing a steady state output.

A digital input circuit 322, such as an RCA 4503 tristate buffer, receives the schedule and weld information from weld timer 300. The digital input circuit stores the most recent signals received to provide a continuing reference to the control circuit of the present state of the weld timer.

A random access memory (RAM) 330 stores various information from the microprocessor and from the main weld timer. The information it stores includes the schedule which is selected at main weld timer 300, the present line cycle count, a series of error numbers for generating error messages, a list of programmable or preset weld parameters for each schedule, a historical list of actually measured weld parameters for the last weld in each schedule, a storage for various sub-routines. The list of programmable weld parameters includes the number of line cycles of blanking to be provided, the number of cycles to the low limit, the number of cycles to the high limit, the predetermined percent resistance drop, the initial heat, the maximum allowed percent heat, the number of consecutive high limit welds before the percent heat is incremented, the number of consecutive low limit welds before the percent heat is decremented, the initial percent heat and other parameters as may be desired. The actually measured parameter list or historical list includes the percent heat, number of welds performed, the peak current, the peak voltage, the peak resistance, the final current, the final voltage, the final resistance, the number of cycles to the peak and other parameters as may be desired. The various sub-routines perform parity checks, perform conversions from decimal to binary or binary coded decimal, implement ASCII conversions in conjunction with a keyboard display, perform mathematical operations in the heat adjustment and resistance algorithms (discussed above in conjunction with FIG. 3), debounce keyboard entries and the like.

A pair of read only memories 332, 334 store the programs for a microprocessor 340. In the preferred arrangement of the subject invention, and by way of example only, a suitable microprocessor comprises an RCA CDP 1802D manufactured and marketed by RCA Corp. (RCA) of New York, N.Y. Microprocessor 340 performs two separate functions. First, it reads a keyboard input and provides an output display and second, it controls main weld timer 300. Flow charts of the microprocessor logic as related to controlling the weld timer will be described in detail hereinafter with reference to FIG. 5 and related to receiving keyboard commands and producing displays with reference to FIG. 6. Continuing with reference to FIG. 4, a memory bank decoder 342 is used in conjunction with the microprocessor to expand its addressing capability from eight to sixteen bits. A suitable memory bank decoder is described in the RCA CDP 1802D microprocessor handbook and is available from RCA. Another microprocessor peripheral, also available from RCA, is a reset processor circuit 344 which maintains the processor operations in sequence when the control circuit is turned on or reset. A processor fault detection circuit 346 determines whether the microprocessor is running correctly, i.e., it determines whether the processor is performing keyboard functions or weld control functions. If it is performing either function, the microprocessor is running properly. If it is performing neither function, circuit 346 actuates a light to indicate a probable malfunction. A weld interrupt circuit 348 provides the appropriate timing with which to interrupt the processor. The weld interrupt circuit assures that the microprocessor finishes its last keyboard related instruction before starting to control a weld.

A peak detector 350 and an analog to digital conversion circuit 352 monitor the power at the welding electrodes. Specifically, the peak detector 350 provides a digital edge to the microprocessor when a current peak 16 or 16' (FIG. 1C) occurs. The analog to digital conversion circuit is connected with the welding transformer to monitor the welding current and with each of three welding guns associated respectively with the first, second, and third schedules. The analog to digital converter monitors the current and voltage across the welding gun of the selected schedule and provides a digital representation of these values.

A twelve-button keyboard 360 is provided for the operator to enter and select the programmable weld parameters for each schedule. For each schedule, the operator can enter the number of cycles of blanking, the number of cycles to the low limit, the number of cycles to the high limit, the percentage resistance drop, and the other weld parameters of the programmable parameter list set forth above. Associated with the keyboard is a alpha-numeric display 362 such as LITRONIX DL-1416 manufactured and marketed by Litronix, Inc. of Tantau, Cupertino, Calif. The alpha-numeric display conveniently displays the programmable parameter list for each of the schedules, the historical parameter list for the last weld in each schedule, error messages and the like.

Figure 5:
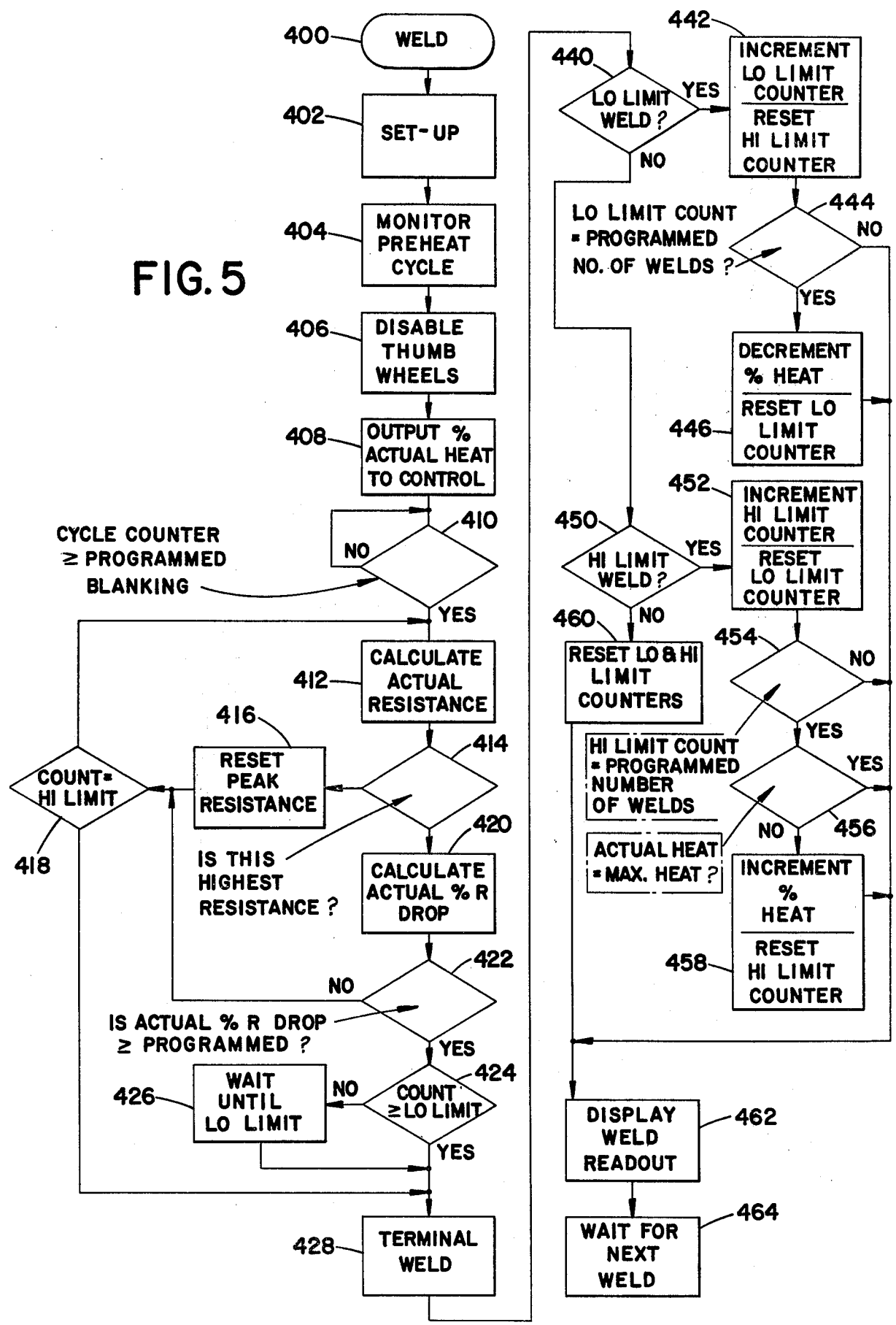
FIG. 5 is a logic flow chart for programming the computer in the control circuit of FIG. 4.

FIG. 5 shows a flow chart for programming microprocessor 340 of FIG. 4 in order to control weld timer 300. With primary reference to FIG. 5 as well as secondary reference to FIG. 4, a controlled weld is commensed as at step 400, weld interrupt circuit 348 delays the control function from commensing until any keyboard operation in progress has been completed. This duration is very short compared to the duration of one line cycle. The program performs various set up and initialization steps 402 such as emptying storage registers for monitored information, zeroing the cycle count register, and the like. Commonly, a weld includes a preheat cycle in addition to the weld cycle. In the preheat cycle, a small current is applied through the weld before the main welding current is applied. If a preheat cycle is being used in the weld schedule selected in step 402, the control circuit monitors the peak weld current, voltage and resistance of the preheat cycle. The preheat cycle, however, is controlled by weld timer 300 rather than the present control. After the preheat cycle, the control disables, as at step 406, the thumbwheel controls and substitutes its own control. The percent heat is retrieved from RAM 330 and supplied, as at step 408, to digital output circuit 320 to control the percent heat produced by the weld timer.

At step 410, the program checks whether the line count of the weld in progress has equaled or exceeded the blanking count. If not, the circuit goes into a hold pattern until the blanking count has been met or exceeded. If the blanking count is exceeded, the program, at step 412, determines the present cycle resistance of the weld. At step 414, the program compares the present cycle resistance to the highest resistance generated so far in this weld to determine whether or not this is a possible peak resistance. If it is the highest or a peak resistance, peak resistance register 202 is reset at step 416 with this new resistance value. At step 418, the program checks whether the cycle count matches the high limit. If not, it returns to step 412 to await the next line cycle. If the count does equal the high limit, step 418 skips to a weld terminate step. If it is determined in step 414 that the actual or present resistance is not the highest resistance so far, the program determines, at step 420, the percent drop the present cycle resistance is from the peak resistance stored in the peak resistance register 202 at step 416. At step 422, the program determines whether the percent drop of the present cycle resistance from the peak resistance exceeds a preprogrammed percent drop. If it has not, step 422 returns the program to step 418 to check whether or not the high limit is exceeded. If it is determined in step 422 that the preprogrammed percent drop has been reached, a step 424 is initiated to determine whether or not the line cycle count meets or exceeds the low limit. If it has not, as at step 426, the program goes into a holding cycle until the low limit is met. If the low limit is met or exceeded, the program advances to a weld terminating step 428.

Upon terminating a weld, step 440 of the program determines whether the weld was a low limit weld. That is, step 440 determines whether the programmed percent drop in the resistance occurred at or before the low limit. If it is a low limit weld, a step 442 increments the count stored in low limit welds counter 140 in RAM 330 and resets high limit counter 142 to zero. At step 444, the program determines whether the low limit count stored in the low limit counter equals the programmed number of low limit welds to decrement stored in register 146. If the count is below the programmed number, the program skips to the end. If the low limit counter has achieved the programmed number of welds to decrement, the percent heat parameter stored in RAM 330 is reprogrammed lower or decremented as at step 446 and the low limit counter is reset.

If the weld is determined not to be a low limit weld at step 444, step 450 then determines whether the weld is a high limit weld. That is, it determines whether the weld was terminated because the cycle count equaled the high limit. If it determines that the weld is a high limit weld, high limit counter 142 is incremented as at step 452 and low limit counter 140 is reset. At step 454, the program determines whether the incremented high limit count is equal to the programmed number of high limit welds to an increment. If the high limit count is still below the programmed number, the program skips to the end. If the incremented high limit count does equal to the programmed number of welds, a comparison is made at step 456 to determine whether the actual or current setting of the percent heat is equal to a predetermined maximum percent heat. If the actual percent heat is at the maximum, then the program skips to the end. If the actual percent heat is below the maximum, the percent heat stored in RAM 330 is reprogrammed higher or incremented at step 458 and high limit counter 142 is reset.

If the weld was neither a low limit weld at step 440 nor a high limit weld at step 450, both the high limit counter and the low limit counter are reset to zero at step 460. When the appropriate incrementing or resetting of the low and high limit counters is completed and any reprogramming of the percent heat is completed, a readout is generated at step 462 for display on alpha-numeric display 362. This display indicates that the percent heat has been incremented or decremented. After preparing the readout, the program waits at step 464 for the next weld to be started.

Figure 6:
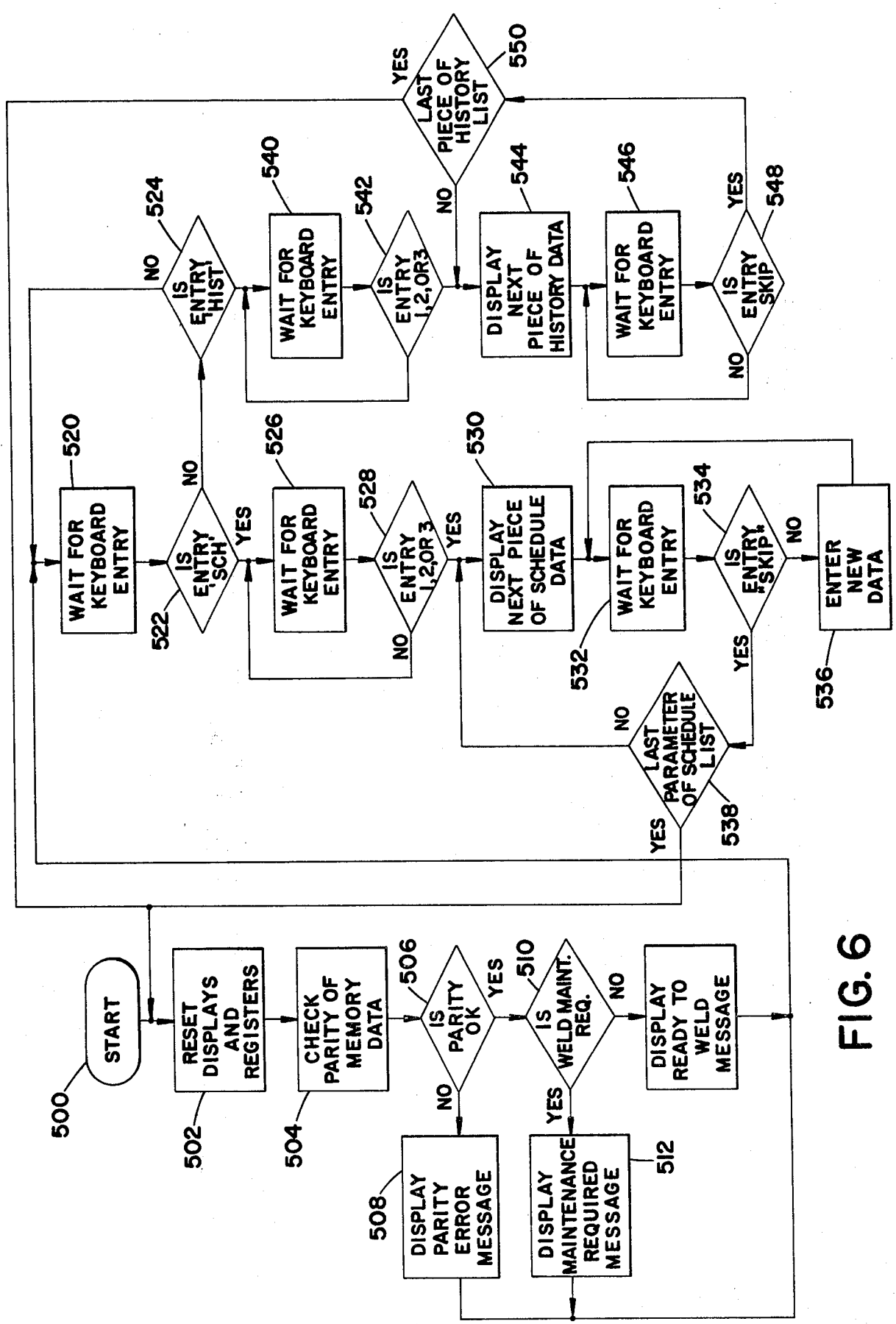
FIG. 6 is a logic flow chart for programming the computer in the control circuit of FIG. 4.

FIG. 6 shows a flow chart for programming microprocessor 340 of FIG. 4 in order to receive changes in the weld parameters from keyboard 360 and to produce displays of the programmed weld parameters for each schedule, the actual parameters of the last weld in each schedule from the historical list, error messages and the like. With primary reference to FIG. 6 as well as secondary reference to FIG. 4, upon application of power to the system, the alpha-numeric display on display 362 and the appropriate registers are reset, as at step 502. At step 504, the parity of the data in the memory is checked and a determination, as at step 506, is made to whether or not the parity is correct. If the parity is not correct, at step 508 a predetermined parity error message is retrieved from RAM 330 and displayed on the alpha-numeric display 362 as at step 508.

A maintenance check is made at step 510. The maintenance check determines whether any forbidden weld parameters are called for in the next weld. For example, it determines whether the programmed percent heat is greater than or equal to a predetermined maximum percent heat for the materials to be welded in this schedule. The programmed percent heat, as illustrated above, may have been automatically adjusted based on the duration of preceding welds beyond a preprogrammed maximum. If the maintenance check determines that a forbidden weld parameter or the like is called for, a predetermined error message is retrieved from ROM 332 and displayed on the alpha-numeric display 362, as at step 512. In response to such a display, the operator can check the welding apparatus to determine what maintenance is required, reprogram the weld parameters or take other appropriate action.

If it is determined at step 510 that no maintenance is required, at step 514, a predetermined ready-to-weld message is displayed on the alpha-numeric display 362. After the ready-to-weld message is displayed, the system is ready to be reprogrammed with new weld parameters or to display the actual weld parameters of the historical list for the preceding weld in each schedule.

At step 520, the program awaits the actuation of an appropriate key on keyboard 360. The appropriate entries fall into two categories, labeled "schedule" and "history". Schedule entries reprogram the programmed weld parameters for each schedule. History entries cause a display of the actual weld parameters measured in the last weld performed in each schedule. At step 522, the program determines whether the schedule indicating key from keyboard 360 has been depressed. If it is not a schedule entry, the program at step 524 determines whether or not history indicating key from keyboard 360 has been actuated. If the entry is neither a schedule nor a history entry, the program returns to step 520 and awaits an appropriate entry.

If it was determined at step 522 that a schedule entry is to be received, the program waits as at step 526 for the appropriate entry. The first entry indicates which of the plurality of schedules, in the preferred embodiment three schedules, the entry is to concern. If the entry is not a number corresponding to one of the schedules, the program returns to step 526 and awaits an appropriate instruction. As indicated above, the RAM 330 stores a plurality of weld parameters for each of the schedules. These weld parameters includes the number of cycles of blanking, the number of cycles to the low limit, the number of cycles to the high limit, the percent resistance drop, and other weld parameters set forth above. These weld parameters are stored in a predetermined order and retrieved one at a time for display on the alpha-numeric display. At step 530, the program causes the first or next weld parameter of the predetermined order to be displayed on the alpha-numeric display 362. An exemplary first display is "3 CY BLANKING". The appropriate weld parameter is displayed and the program waits for the next keyboard entry as at step 532. There are two types of entries which are appropriately received at this point—an entry indicating that the next weld parameter of the predetermined list should be displayed or an entry changing the displayed weld parameter. At step 534, the program determines whether the entry indicates that the program should skip to displaying the next weld parameter. If the entry is not a skip command, the entry changes the displayed parameter as at step 536. Continuing the above example, the new entry may be the numeral 4 to change the number of cycles of blanking stored in blanking register 154 are changed from 3 to 4. After changing the displayed weld parameter, the program returns to step 532 to wait for a command to either change the weld parameter again or to skip to the next weld parameter. When it is determined as at step 534 that the entry is a skip, it is further determined as at step 536 whether the last weld parameter in the list is displayed. If the last parameter in the list is displayed, the program returns to step 502 to await the next entry, elsewise the program returns to step 530 and displays the next weld parameter in the list. An example of the second weld parameter in the list might be "10 CY LO LIMIT". In this manner each weld parameter in the list is serially displayed and, if desired, changed.

If it was determined at step 524 that a history entry is being made, the program waits as at step 540 for the next keyboard entry. The anticipated next keyboard entry is a selection of the appropriate one of the plurality of schedules for which the history is to be displayed. At step 542, the program determines whether the entry is a number corresponding to one of the schedules. If it is not, the program returns to step 540 to await an appropriate entry. If it is, the first of the actually measured parameters in the historical list of parameters stored in RAM 330 is displayed. As set forth above, during each weld, the RAM 330 records various predetermined weld parameters such as the percent actual heat of the weld, the number of welds which have been performed in that schedule, the peak current during the weld, the peak voltage during the weld and the like. The program causes the first or the next actual weld parameter message from RAM 530 to be retrieved and displayed as at step 544. An exemplary first actual weld parameter might be "85% ACTUAL HT". After producing the display on the alpha-numeric display, the program waits as at step 546 for the next command. If it is determined at step 548 that the next command is not a skip command, the program returns to step 546 and awaits a skip command. If the next command is a skip command, the program determines whether or not the displayed actual parameter is the last parameter in the list as at step 550. If it is not, the program returns to step 544 and retrieves the next actual parameter in the selected schedule. An exemplary second actual parameter might be "126 WELDS". This procedure is repeated until the operator has skipped through the entire historical list of actual weld parameter and the last weld parameter is reached. When the skip key is depressed and it is determined at step 550 that the last historical parameter in the list is displayed, the program returns to step 502 to await the next entry.

The invention has been described with reference to the preferred embodiment. Obviously, modifications and alterations will occur to others upon reading and understanding this specification. It is intended to include all such modifications and alterations insofar as they come within the scope of the appended claims or the equivalents thereof.

Having thus described my invention, I now claim:

1. A feedback welding control for controlling the percent heat and other weld parameter of a resistance welding machine comprising:
    weld duration measuring means for measuring the actual duration of each weld;
    a high limit comparing means for comparing each measured weld duration with a preselected high limit duration and a low limit comparing means for comparing each measured weld duration with a preselected low limit duration, the high limit comparing means and the low limit comparing means being operatively connected with the weld duration measuring means to receive each measured weld duration; and,
    percent heat adjustment means for automatically incrementing the percent heat in accordance with the comparisons of the preselected high limit duration and the measured weld duration of a plurality of preceding welds and for automatically decrementing the percent heat in accordance with the comparisons of the preselected low limit duration and the measured weld durations of a plurality of preceding welds.

2. The control as set forth in claim 1 further including a high limit counter for counting the welds in which the measured weld duration exceeds the high limit duration, the high limit counter being operatively connected with the high limit comparing means and with the percent heat adjustment means for incrementing the percent heat adjustment in accordance with the high limit counter attaining a preselected high limit weld count.

3. The control as set forth in claim 2 further including a high limit count comparing means for comparing the high limit weld count of the high limit counter with a predetermined number of high limit welds, the high limit count comparing means being operatively connected with the high limit counter to receive the high limit weld count therefrom and being operatively connected with the percent heat adjusting means for incrementing the percent heat adjustment in response to the high limit weld count equalling the predetermined number of high limit welds.

4. The control means as set forth in claim 3 further including a reset means for resetting the high limit counter in response to a weld terminating without the high limit comparing means determining that the measured weld duration exceeded the high limit duration whereby the percent heat adjustment means is incremented in response to the occurrence of the preselected number of high limit welds in succession.

5. The control as set forth in claim 4 further including a low limit counter for counting the welds in which the measured weld duration exceeds the low limit duration, the low limit counter being operatively connected with the low limit comparing means and a high limit count comparing means for comparing the low limit weld count of the low limit counter with a preselected number of low limit welds, the low limit count comparing means being operatively connected with the low limit counter to receive the low limit weld count therefrom and being operatively connected with the percent heat adjusting means for decrementing the percent heat adjustment in response to the low limit weld count equalling the predetermined number of low limit welds and wherein the reset means further resets the low limit counter in response to a weld terminating without the low limit comparing means determining that the measure weld duration failed to exceed the low limit duration.

6. A feedback welding control for controlling the precent heat and other weld parameters of an a.c. resistance welding machine comprising:
    a cycle counting means for counting the number of line cycles in each weld, the number of line cycles being a measurement of the weld duration; and,
    percent heat adjustment means for automatically adjusting the percent heat in accordance with the line cycles counted in a plurality of preceding welds.

7. The control as set forth in claim 6 further including a percent heat algorithm means for comparing the line cycles counted in each weld with a preselected percent heat adjustment condition, the percent heat algorithm means producing an adjustment signal in response to the preselected percent heat adjustment condition being met, said percent heat adjustment means adjusting the percent heat in response to the adjustment signal.

8. The control as set forth in claim 7 wherein said percent heat algorithm means includes a first comparing means for comparing the line cycles counted by the line cycle counting means with a first preselected weld limit number to determine if a preselected relationship between the actual cycle count and limit number occurs, the first comparing means being operatively connected with the line cycle counting means to receive the number of counts therefrom and being operatively connected with the percent heat adjustment means for enabling the adjustment means in accordance with the comparison.

9. The control as set forth in claim 8 wherein the first limit number is a low limit number and wherein the preselected relationship is a failure of the line cycle count to exceed the low limit number.

10. The control as set forth in claim 8 wherein the first limit number is a high limit and wherein the preselected relationship is the line cycle count matching the high limit number.

11. The control as set forth in claim 6 further including a percent heat algorithm means for comparing cycle counts with a preselected increment condition and a preselected decrement condition, the percent heat algorithm means producing an increment signal in response to the preselected increment condition being met and a decrement signal in response to the preselected decrement condition being met, said percent heat adjustment means adjusting the percent heat by incrementing the percent heat in response to an increment signal and by decrementing the percent heat in response to a decrement signal.

12. The control as set forth in claim 11 wherein the percent heat algorithm means includes a high limit comparing means for comparing the line cycle count with a preselected high limit number and a low limit comparing means for comparing the cycle count with a preselected low limit number, the high limit comparing means and the low limit comparing means being operatively connected with the cycle counting means to receive the number of line counts therefrom and being operatively connected with the percent heat adjustment means for causing incrementing and decrementing of the percent heat.

13. The control as set forth in claim 12 wherein the percent heat adjustment means includes a percent heat increment means for increasing the percent heat and a percent heat decrement means for decreasing the percent heat.

14. The control as set forth in claim 13 further including a low limit counter for counting the number of welds in which the line cycle count fails to exceed the low limit number and a high limit counter for counting the number of welds in which the cycle count matches the high limit number, the low limit counter being operatively connected with the low limit comparing means and with the percent heat decrement means for causing the percent heat to be decremented after a predetermined number of welds in which the line cycle count fails to exceed the low limit number, the high limit counter being operatively connected with the high limit comparing means and with the percent heat increment means for causing the percent heat to be incremented after a predetermined number of welds in which the line cycle count matches the high limit number.

15. The control as set forth in claim 14 further including reset means for resetting the low limit counter in response to a weld terminating with the line cycle count exceeding the low limit number and for resetting the high limit counter in response to a weld terminating without the line cycle count matching the high limit number, whereby the percent heat is decremented in response to the predetermined number of welds terminating below the low limit in succession and incremented in response to the predetermined number of welds terminating at the high limit in succession.

16. The control as set forth in claim 6 further including weld resistance detecting means for detecting the resistance of the weld in each line cycle, resistance algorithm means for comparing each line cycle weld resistance with a preselected weld resistance condition, and weld terminating means for terminating the weld in response to the selected resistance condition being met.

17. The control as set forth in claim 16 wherein the resistance condition is detecting a cycle resistance which is below a preceding cycle resistance of the same weld by a predetermined percent.

18. The control as set forth in claim 16 further including storage means for storing the value of the highest preceding cycle resistance detected during each weld and first resistance comparing means for comparing each detected cycle resistance with the stored resistance value, the higher of the two being returned to the storage means.

19. The control as set forth in claim 18 further including means for determining whether each detected cycle resistance is below the stored resistance value by at least a predetermined amount, the weld terminating means being operatively connected to the determining means for terminating the weld when the resistance drops by the predetermined amount.

20. A feedback welding control for a resistance welding machine comprising:
a digital output circuit for providing a percent heat command output to a weld timer of the controlled welding machine;
a digital input circuit for receiving weld data from the weld timer of the controlled welding machine;
a keyboard for operator entry of weld parameters;
a first memory means for storing weld information from the digital input circuit and preset weld parameters from the keyboard, the first memory means being operatively connected with the digital input circuit and with the keyboard;
an analog to digital conversion circuit for converting analog weld current and resistance values to digital weld parameter data; and
a microprocessor which is preprogrammed to implement a weld control function, including a percent heat algorithm for selectively incrementing and decrementing the percent heat command in response to the duration of a plurality of preceding welds meeting a percent heat increase condition and a percent heat decrease condition, respectively, the microprocessor being operatively connected with the weld timer of the controlled welding machine, with the digital input circuit, with the memory means, and with the analog to digital conversion circuit for receiving data therefrom for application to the percent heat algorithm and being operatively connected with the digital output circuit for changing the percent heat command output in response to the percent heat condition being met.

21. The control as set forth in claim 20 further including an alpha-numeric display for displaying weld parameter data and messages derived from weld data, the alpha-numeric display being operatively connected with said microprocessor.

22. The control circuit as set forth in claim 21 further including read only memory means for storing programs for the microprocessor.

23. A method of controlling the percent heat in a resistance welding machine comprising:
measuring the duration of each weld;
comparing each measured duration with a high limit duration and with a low limit duration; and
increasing the percent heat in response to the measured duration in at least a preselected number of welds matching or exceeding the high limit duration and decreasing the percent heat in response to the measured duration in at least a preselected number of welds failing to exceed the low limit duration.

24. The method as set forth in claim 23 further including the step of determining during each weld whether a preselected weld resistance condition is met before comparing the weld duration with the low limit duration.

25. The method as set forth in claim 24 further including the step of terminating a weld in response to the one of:
 (a) the weld duration matching the high limit duration, and
 (b) the weld duration matching or exceeding the low limit duration and the weld resistance condition being met.

26. The method as set forth in claim 25 further including:
 (a) counting the number of successive low limit welds in which the weld duration fails to exceed the low limit duration until a predetermined number of low limit welds are counted and then performing the step of decreasing the percent heat; and
 (b) counting the number of successive high limit welds in which the weld duration matches the high limit duration until a predetermined number of high limit welds are counted and then performing the step of increasing the percent heat.

27. The method as set forth in claim 23 wherein the step of measuring the duration of each weld including counting the line cycles and wherein the step of comparing with a low limit duration includes comparing the line cycle count with a predetermined low limit number and the step of comparing with a high limit duration includes comparing with a predetermined high limit number.

28. The method as set forth in claim 23 further including the steps of measuring actual weld parameters during each weld; storing the measured weld parameters; and selectively displaying the measured weld parameters.

29. The method as set forth in claim 28 wherein the step of selectively displaying the measured weld parameters includes displaying a predetermined list of parameters in a predetermined sequence.

30. The method as set forth in claim 23 further including the steps of storing the high limit duration and the low limit duration; displaying a representation of at least a part of the high and low limit durations; changing the displayed part of the high and low limit durations, and substituting and storing the changed part for the corresponding stored part of the high and low limit durations.

* * * * *